United States Patent
Cho et al.

(10) Patent No.: US 9,882,716 B2
(45) Date of Patent: Jan. 30, 2018

(54) METHOD AND APPARATUS FOR GENERATING AND PROCESSING QUANTUM SIGNAL IN REGULAR FRAME UNIT FOR QUANTUM ENCRYPTION KEY DISTRIBUTION

(71) Applicant: SK TELECOM CO., LTD., Seoul (KR)

(72) Inventors: Jeong-sik Cho, Daejeon (KR); Jeong-woon Choi, Yongin-si (KR)

(73) Assignee: SK TELECOM CO., LTD., Seoul (KR)

( * ) Notice: Subject to any disclaimer, the term of this patent is extended or adjusted under 35 U.S.C. 154(b) by 228 days.

(21) Appl. No.: 14/697,595

(22) Filed: Apr. 27, 2015

(65) Prior Publication Data

US 2015/0326391 A1 Nov. 12, 2015

Related U.S. Application Data

(63) Continuation of application No. PCT/KR2013/007511, filed on Aug. 21, 2013.

(30) Foreign Application Priority Data

Oct. 30, 2012 (KR) ........................ 10-2012-0121540

(51) Int. Cl.
*G06F 21/00* (2013.01)
*H04L 9/08* (2006.01)
*H04L 9/12* (2006.01)

(52) U.S. Cl.
CPC .............. *H04L 9/0852* (2013.01); *H04L 9/12* (2013.01)

(58) Field of Classification Search
None
See application file for complete search history.

(56) References Cited

U.S. PATENT DOCUMENTS

2005/0190921 A1* 9/2005 Schlafer ................ H04L 9/0858
380/278
2007/0025551 A1 2/2007 Harrison et al.
(Continued)

FOREIGN PATENT DOCUMENTS

JP 2010273267 A 12/2010
WO 2004073235 A2 8/2004

OTHER PUBLICATIONS

International Search Report for PCT/KR2013/007511 dated Dec. 24, 2013.

*Primary Examiner* — Jeffery Williams
(74) *Attorney, Agent, or Firm* — Hauptman Ham, LLP (57) ABSTRACT

A transmitter for generating and processing quantum signals in regular frame units in a quantum key distribution system, includes: a photon pulse stream generator to generate quantum information in numbered frame units and periodically transmit the quantum information through a quantum channel; a public channel transceiver to communicate with a receiver of the quantum key distribution system through a public channel; a frame synchronization information generator to generate frame synchronization information for frame synchronization of the receiver, and transmit the frame synchronization information through the public channel transceiver to the receiver, in every frame or every several frames; and a signal processor to transmit and receive open information on the every frame or every several frames through the public channel transceiver, and process the quantum information in frame units.

10 Claims, 4 Drawing Sheets

(56) References Cited

U.S. PATENT DOCUMENTS

2008/0037790 A1* 2/2008 Berzanskis .......... H04L 9/0852
                                                    380/278
2012/0045003 A1   2/2012 Li et al.

* cited by examiner

METHOD AND APPARATUS FOR GENERATING AND PROCESSING QUANTUM SIGNAL IN REGULAR FRAME UNIT FOR QUANTUM ENCRYPTION KEY DISTRIBUTION

CROSS-REFERENCE TO RELATED APPLICATIONS

The present application is a continuation of International Patent Application No. PCT/KR2013/007511, filed on Aug. 21, 2013, which is based upon and claims the benefit of priority to Korean Patent Application No. 10-2012-0121540, filed on Oct. 30, 2012. The disclosure of the above-listed applications are hereby incorporated by reference herein in their entirety.

TECHNICAL FIELD

The present disclosure in one or more embodiments relates to a method and apparatus for generating and processing quantum signals in regular frame units for quantum key distribution.

BACKGROUND

The statements in this section merely provide background information related to the present disclosure and do not necessarily constitute prior art.

As higher-speed quantum key distribution systems (QKD systems) are introduced, the speed of generating and detecting a quantum signal is increasing. The inventor(s) noted that to increase the final key generation speed, it is necessary to have not only a fast signal processing circuit but also an efficient signal processing scheme. The inventor(s) also noted that there are factors irrespective of the performance of the signal processing circuit, such as an idle time for waiting until information is completely transmitted and received through a public channel and the order of pre-processing and post-processing using the shared information, but these factors makes a total quantum information processing time longer than a quantum information transmission and detection time.

The inventor(s) experienced that when quantum information is transmitted, since the number of times that a receiver detects a photon signal is very small compared to a system clock, received information subject to signal processing is not easily arranged in correct order. Furthermore, the inventor(s) experienced that considering that, for basis comparison and decoy signal processing, information generated by both a transmitter and a receiver should be stored until signal processing is completed, transmitting and performing signal processing on quantum information in frame units is advantageous. A frame refers to a lump of information considered as a unit when the phase or polarization of bit/basis information is modulated, the amplitude of decoy information is modulated, and modulation information is stored for subsequent signal processing.

The inventor(s) noted that when frame-unit quantum information is transmitted, signal processing should be completed within a frame cycle. However, The inventor(s) experienced that processing within a cycle may not actually be achieved in consideration of a time taken for communication and signal processing. The inventor(s) experienced that consequently, key generation speed of the system is reduced and bandwidths of a quantum channel and a public channel are not efficiently utilized.

For example, U.S. Pat. No. 7,539,314 discloses a QKD system in which a transmitter generates and transmits a frame signal, a receiver completely processes the frame signal and then transmits a ready signal to the transmitter, and the transmitter checks the ready signal and then transmits a subsequent frame.

The inventor(s) has noted that according to such QKD system, since the transmitter does not transmit a frame-unit quantum signal before a ready signal is received from the receiver, overflow in signal processing of the receiver is prevented. However, the inventor(s) experienced that in terms of operation of the whole system including the transmitter and the receiver, a ratio of actual information exchange compared to operation speed is low and thus key generation speed is reduced.

SUMMARY

In accordance with at least one embodiment of the present disclosure, A transmitter for generating and processing quantum signals in regular frame units in a quantum key distribution system, comprises a photon pulse stream generator, a public channel transceiver, a frame synchronization information generator, and a signal processor. The photon pulse stream generator is configured to generate quantum information in numbered frame units and periodically transmit the quantum information through a quantum channel. The public channel transceiver is configured to communicate with a receiver of the quantum key distribution system through a public channel. The frame synchronization information generator is configured to generate frame synchronization information for frame synchronization of the receiver, and transmit the frame synchronization information through the public channel transceiver to the receiver, in every frame or every several frames. And the signal processor is configured to transmit and receive open information on the every frame or every several frames through the public channel transceiver, and process the quantum information in frame units.

In accordance with another embodiment of the present disclosure, A receiver for receiving and processing quantum signals in regular frame units in a quantum key distribution system, comprises a public channel transceiver, a frame synchronization information processor, a single-photon detector and a signal processor. The public channel transceiver is configured to communicate with a transmitter of the quantum key distribution system through a public channel. The frame synchronization information processor is configured to process frame synchronization information received from the transmitter through the public channel transceiver, and perform frame synchronization. The single-photon detector is configured to detect a photon pulse signal transmitted from the transmitter through a quantum channel. And signal processor is configured to perform signal processing on quantum information detected from output of the single-photon detector, in frame units based on frame number information comprised in the frame synchronization information and frame-unit signal processing information transceived to and from the transmitter through the public channel transceiver.

In accordance with another embodiment of the present disclosure, A method for generating and processing quantum signals in regular frame units by a transmitter of a quantum key distribution system, comprises: transmitting frame synchronization information for frame synchronization of a receiver of the quantum key distribution system through a public channel; generating quantum information in numbered frame units and periodically transmitting the quantum information to the receiver through a quantum channel; and transmitting open information on each frame in the quantum information through the public channel In accordance with yet another embodiment of the present disclosure, A method for receiving and processing quantum signals in regular frame units by a receiver of a quantum key distribution system, comprises: receiving frame synchronization information from a transmitter of the quantum key distribution system through a public channel and performing a frame synchronization process; generating initial quantum information from a stream of photon pulses carrying frame-unit quantum information transmitted through a quantum channel; receiving frame-unit open information from the transmitter through the public channel; and performing signal processing on the initial quantum information in frame units based on frame number information or signal processing information comprised in the frame synchronization information.

DETAILED DESCRIPTION

Hereinafter, at least one embodiment of the present disclosure will be described in detail with reference to the accompanying drawings. In the following description, like reference numerals designate like elements although the elements are shown in different drawings. Further, in the following description of the at least one embodiment, a detailed description of known functions and configurations incorporated herein will be omitted for clarity and brevity.

Some embodiments of the present disclosure provide a method and apparatus for generating and processing quantum signals in regular frame units, by which a transmitter periodically generates and transmits a quantum signal of each numbered frame and a receiver processes the quantum signal appropriately for frame number information, thereby improving system performance.

Additionally, terms such as first, second, A, B, (a), (b), etc. are used to describe elements of the present disclosure. These terms are only used to distinguish corresponding elements from other elements and the nature, order or sequence of the elements should not be limited by the terms. Throughout this specification, the terms "comprises" and/or "comprising", or "includes" and/or "including" specify the presence of stated elements but do not preclude the presence or addition of one or more other elements unless otherwise specified. Further, a suffix such as "module" or "unit" is used to denote an element for performing at least one function or operation, and such element is implemented in hardware, software, or a combination thereof.

In a quantum key distribution system according to at least one embodiment of the present disclosure, a transmitter periodically transmits a quantum signal of each numbered frame and transmits frame synchronization information before transmitting the quantum signal, and a receiver receives and stores the quantum signal by analyzing the frame synchronization information and generates a quantum key by performing signal processing appropriately for frame number information.

Figure 1:
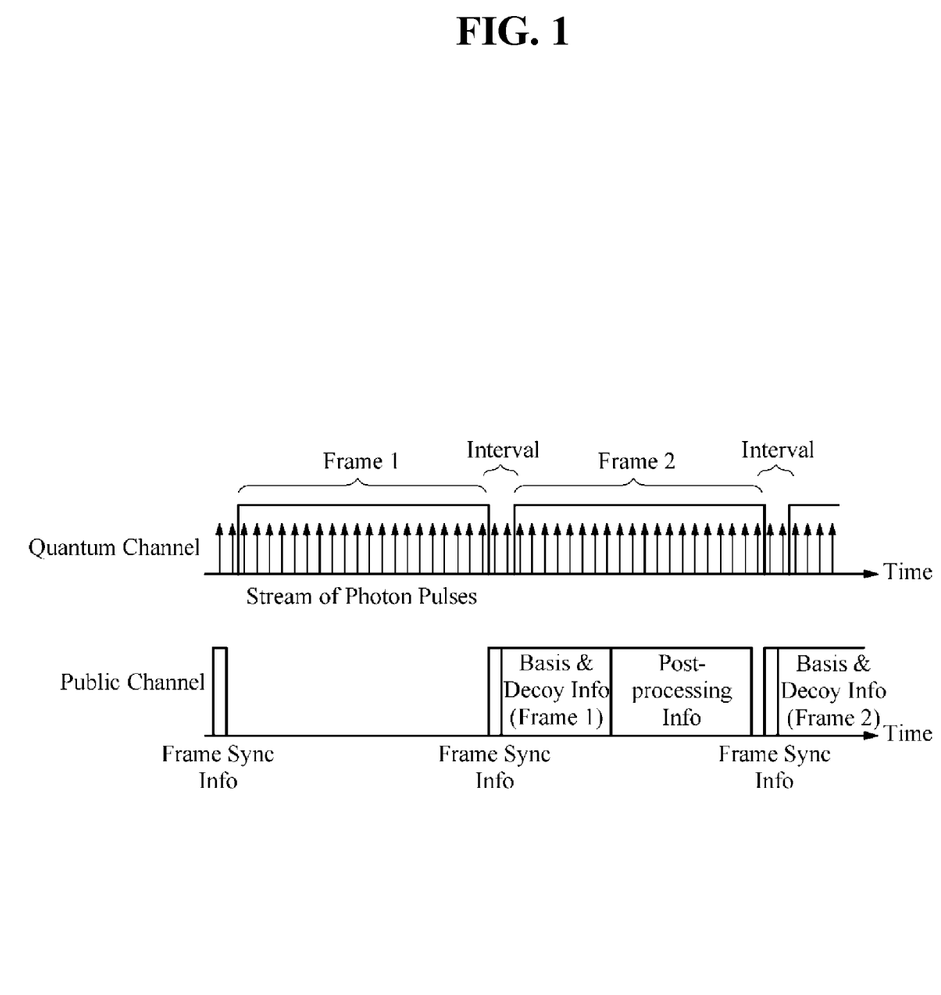
FIGS. 1, 2 and 3 are diagrams showing exemplary schemes for transmitting quantum signals and signal processing information in frame units in a quantum key distribution system according to at least one embodiment of the present disclosure.
Figure 2:
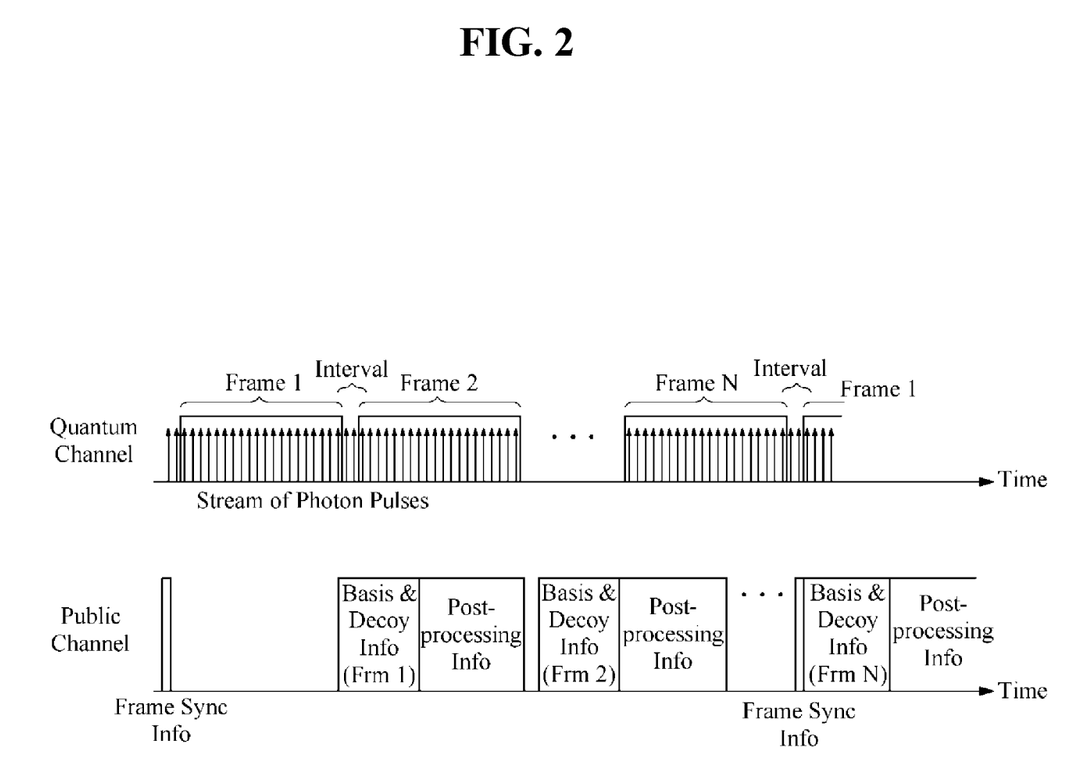
Figure 3:
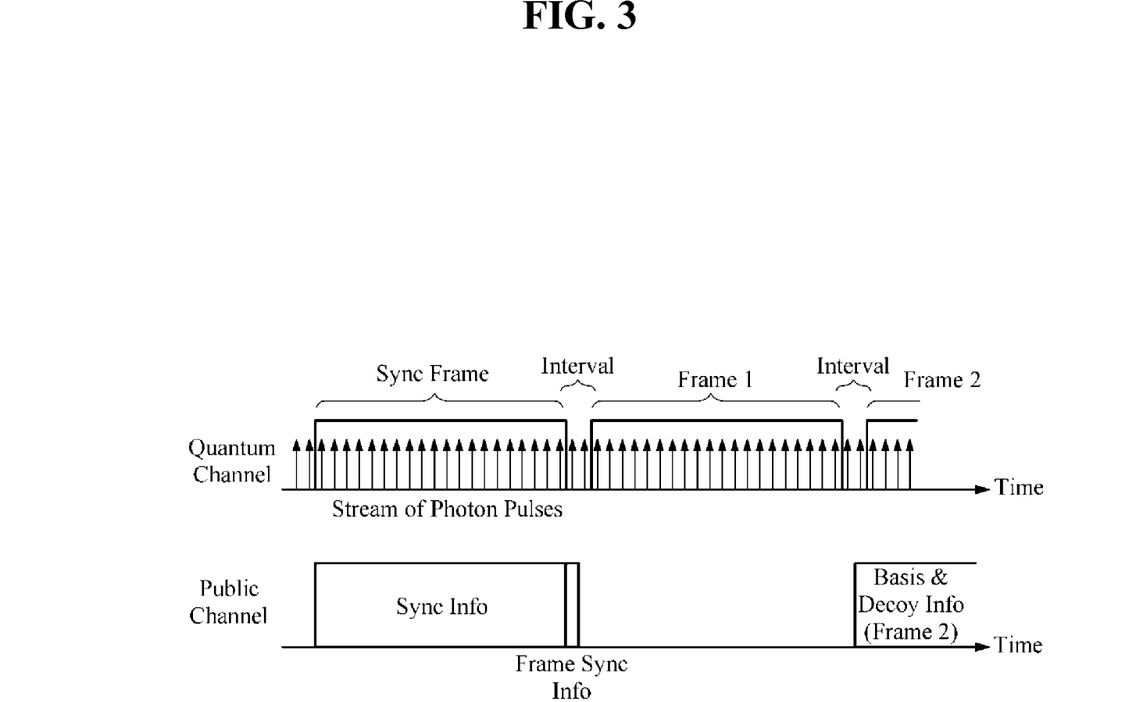

FIGS. 1, 2 and 3 are diagrams showing exemplary schemes for transmitting quantum signals and signal processing information in frame units in a quantum key distribution system according to at least one embodiment of the present disclosure.

According to at least one embodiment of the present disclosure, a transmitter transmits a quantum signal of each of frames numbered from 1 to N through a quantum channel as illustrated in FIG. 1. In addition, the transmitter transmits frame synchronization information or information for signal processing through a public channel together with frame number information. Upon receiving the quantum signal, a receiver stores the quantum signal together with the frame number information to utilize the same (i.e., the quantum signal) for signal processing, and transmits signal processing information through the public channel together with the frame number information. As such, both the transmitter and the receiver are correctly perform signal processing corresponding to each frame.

A frame interval is minimized to increase the efficiency of system operation. Although a single-photon pulse should not be present between frames in an ideal case, a minimum interval needs to be set not to cause overflow in signal processing in consideration of a time for which the receiver prepares for reception after receiving a frame synchronization signal, the amount of traffic of the public channel, a signal processing time, etc.

Although the transmitter does not transmit a single-photon pulse at a frame interval, the single-photon pulse continues to be transmitted. The single-photon pulse transmitted at a frame interval is encoded or not. Even when the transmitter transmits an encoded single-photon pulse between frames, the receiver ignores such single-photon pulse or information carried thereby.

When the public channel is used, the frame synchronization signal corresponds to top-priority information and thus should be transmitted in an accurate cycle.

Information for basis exchange and decoy information processing corresponding to pre-processing in signal processing is transmitted immediately after corresponding frame transmission, and thus a valid bit selection process is performed to reduce the burden of a transceiver in using memory. Generated bits and the basis and decoy information are stored in the memory associated with a signal processor of the transceiver, and only valid bits are selected and stored after pre-processing and the other information is eliminated.

The frame synchronization information is periodically transmitted before every frame is transmitted as illustrated in FIG. 1, or transmitted once every M frames (M≤N) as illustrated in FIG. 2. Since frame generation and transmission and signal processing have periodicity, when a synchronization time is appropriately controlled, the frame synchronization information does not need to be transmitted whenever the frame-unit quantum information is transmitted. However, when the frame count N (not M) is initialized to 1, the frame synchronization information needs to be transmitted again.

The frame length, the frame count N, and the frame interval are set to arbitrary values by a system operator when the system is installed, and the transceiver already knows the set values and thus periodically generates, transmits, receives, and stores signals according to the set values.

Figure 4:
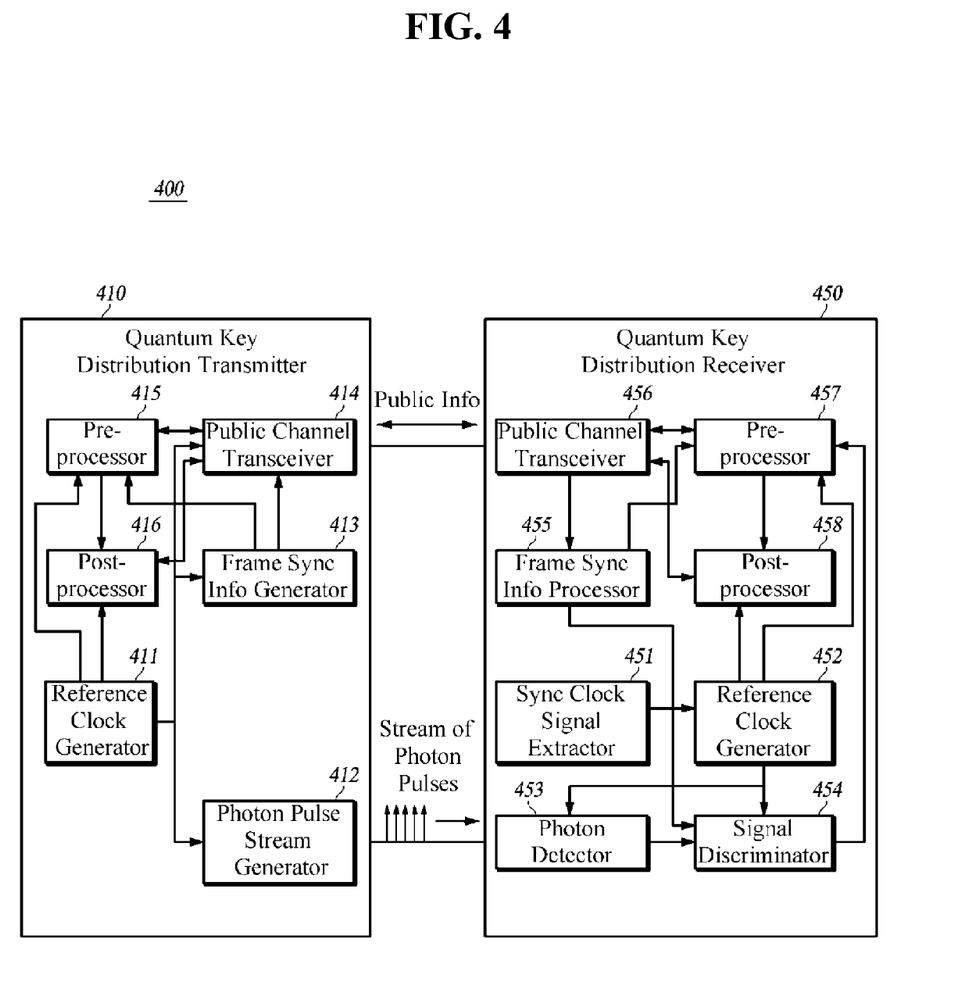
FIG. 4 is a block diagram of a quantum key distribution system for generating and processing quantum signals in regular frame units according to at least one embodiment of the present disclosure.

FIG. 4 is a block diagram of a quantum key distribution system 400 for generating and processing quantum signals in regular frame units according to at least one embodiment of the present disclosure.

A frame synchronization signal is transmitted through a public channel and utilized for signal acquisition, pre-processing, etc. Pre-processed information is transmitted to a post-processor and processed in association with a process for transceiving information for post-processing appropriate for each frame.

In the quantum key distribution system 400 according to at least one embodiment of the present disclosure, a transmitter 410 generates a photon pulse signal and transmits the same through a public channel using timings indicated by a reference clock signal of the transmitter 410, and a receiver 450 extracts clock information from a synchronous public channel or a separate clock transmission channel (not shown in FIG. 4) and uses the clock information as a reference clock signal of the receiver 450, thereby achieving synchronization with the transmitter 410. Other components of the the quantum key distribution system 400, each of the transmitter 410 and the receiver 450 is implemented by, or includes, one or more processors and/or application-specific integrated circuits (ASICs). Each of transmitter 410 and receiver 450 also includes one or more communication module (e.g., communication mobile chip) configured to communicate control signals and/or data signals between a transmitting party and a receiving party over one or more communication network (e.g., wireless communications network, wire communications network). Each of transmitter 410 and receiver 450 further comprises input units such as one or more buttons, a touch screen and so on, and output units such as a display, an indicator and so on.

In addition, the transmitter 410 periodically transmits a quantum signal of each numbered frame and transmits frame synchronization information before transmitting the quantum signal. The receiver 450 receives and stores the quantum signal by analyzing the frame synchronization information, and generates a quantum key by performing signal processing appropriately for frame number information.

As illustrated in FIG. 4, the transmitter 410 includes a reference clock generator 411 configured to generate a reference clock signal, a photon pulse stream generator 412 configured to generate a stream of photon pulses carrying frame-unit quantum information through a quantum channel according to the reference clock signal, a frame synchronization information generator 413 configured to generate a frame synchronization signal according to the reference clock signal and transmit the frame synchronization signal to a public channel transceiver 414, the public channel transceiver 414 configured to exchange data carrying open information with the receiver 450 through a public channel, a pre-processor 415 configured to perform pre-processing such as basis comparison and decoy signal processing in frame units, and a post-processor 416 configured to perform post-processing such as bit error correction. Other components of the transmitter 410, such as each of the reference clock generator 411, the photon pulse stream generator 412, the frame synchronization information generator 413, the public channel transceiver 414, the pre-processor 415 and the post-processor 416 is implemented by, or includes, one or more processors and/or application-specific integrated circuits (ASICs).

The reference clock generator 411 generates a reference clock signal with which the transmitter 410 and the receiver 450 are synchronized, and provides a timing signal to other elements of the transmitter 410 which require synchronization.

The photon pulse stream generator 412 generates photon pulses according to the reference clock signal, modulates the photon pulses, and transmits quantum information and a stream of the photon pulses in frame units to the receiver 450 through the quantum channel. The photon pulse stream generator 412 transmits a synchronization frame for synchronization of the receiver 450 before transmitting the quantum information in frame units. The photon pulse stream generator 412 includes elements which require synchronization, e.g., a laser diode for generating photon pulses and a modulator for modulating the phase or polarization of the photon pulses.

The public channel transceiver 414 transceives a packet including open information divided in frame units, to and from the receiver 450 through the public channel in synchronization with the reference clock signal. When the public channel transceiver 414 is implemented as a synchronous transceiver, 0s and 1s are mixed in the packet at a proper ratio using a scrambling scheme in such a manner that the receiver 450 can appropriately extract clock information from the public channel. In addition, the public channel transceiver 414 transmits the open information including synchronization information to the receiver 450 when the photon pulse stream generator 412 transmits the synchronization frame.

The pre-processor 415 exchanges frame-unit pre-processing information with the receiver 450 through the public channel transceiver 414 while performing pre-processing such as basis comparison and decoy signal processing in frame units.

The post-processor 416 receives a sifted key generated as a result of pre-processing from the pre-processor 415, and exchanges frame-unit post-processing information with the receiver 450 through the public channel transceiver 414 while performing post-processing such as bit error correction.

As illustrated in FIG. 4, the receiver 450 includes a synchronization clock signal extractor 451 configured to extract a clock signal from output data of a public channel transceiver 456 or from a signal transmitted through a separate clock channel, a reference clock generator 452 configured to generate a reference clock signal synchronized with the extracted clock signal, a photon detector 453 configured to receive a stream of photon pulses carrying quantum information from the transmitter 410, a signal discriminator 454 configured to discriminate valid detection information based on an output signal of the photon detector 453, the public channel transceiver 456 configured to exchange data carrying open information with the transmitter 410 through a public channel, a frame synchronization information processor 455 configured to provide a trigger signal indicating the start of a frame from a packet including frame synchronization information received by the public channel transceiver 456, to the signal discriminator 454 and a pre-processor 457, the pre-processor 457 configured to perform pre-processing such as basis comparison and decoy signal processing in frame units on the quantum information acquired by the signal discriminator 454, in synchronization with the generated reference clock signal, and a post-processor 458 configured to receive a sifted key from the pre-processor 457 and perform post-processing such as bit error correction in frame units in synchronization with the generated reference clock signal. Other components of the receiver 450, such as each of the synchronization clock signal extractor 451, the reference clock generator 452, the photon detector 453, the signal discriminator 454, the frame synchronization information processor 455, the public channel transceiver 456, the pre-processor 457 and the post-processor 458 is implemented by, or includes, one or more processors and/or application-specific integrated circuits (ASICs).

The synchronization clock signal extractor 451 extracts a reference clock signal used by the transmitter 410 from the public channel or a separate synchronization channel. That is, the synchronization clock signal extractor 451 generates transition pulses indicating data variation by detecting rising and falling edges of a packet received by the public channel transceiver 456, and extract a clock signal included in the packet or a clock signal transmitted through the separate synchronization channel based on the transition pulses. Specifically, the synchronization clock signal extractor 451 uses a packet including synchronization information transmitted from the transmitter 410 before using frame synchronization information when the system is booted or initialized.

The reference clock generator 452 generates a reference clock signal synchronized with the clock signal extracted by the synchronization clock signal extractor 451.

The photon detector 453 detects a stream of photon pulses in synchronization with an arrival timing of the photon pulses transmitted from the transmitter 410 based on the reference clock signal.

The signal discriminator 454 generates information for signal processing by discriminating valid detection information using an output signal of the photon detector 453, and transmits the information to the pre-processor 457. The pre-processor 457 stores and then processes the information in frame units.

The public channel transceiver 456 transceives a packet including open information divided in frame units to and from the transmitter 410 through the public channel in synchronization with the reference clock signal.

The frame synchronization information processor 455 provides a trigger signal indicating the start of a frame from a packet including frame synchronization information received by the public channel transceiver 456, to the signal discriminator 454 and the pre-processor 457.

The pre-processor 457 exchanges frame-unit pre-processing information with the transmitter 410 through the public channel transceiver 456 while performing pre-processing such as basis comparison and decoy signal processing in frame units.

The post-processor 458 receives a sifted key generated as a result of pre-processing from the pre-processor 457, and exchanges frame-unit post-processing information with the transmitter 410 through the public channel transceiver 456 while performing post-processing such as bit error correction.

The amount of time jitter which can be caused when the transmitter 410 transmits a frame synchronization packet through a public channel, and generates and modulates a stream of photon pulses, and the amount of time jitter which can be caused when the receiver 450 receives the frame synchronization packet and the stream of photon pulses, acquires quantum information, and generates a quantum key by performing signal processing on the acquired quantum information should be controlled in consideration of an operation speed of the quantum key distribution system 400. For example, a system having an operation speed of 100 MHz processes a packet to have jitter within 10 ns. When the jitter exceeds 10 ns, the generated quantum key has a high error rate. In this regard, a device capable of enabling parallel processing and real-time signal processing, e.g., a field programmable gate array (FPGA), is used.

According to various embodiments of the present disclosure as described above, since frames are periodically generated and transmitted without waiting for a frame reception and signal processing completion information of a receiver, operation efficiency and key generation speed of a quantum key distribution system are increased.

Furthermore, a more accurate frame synchronization signal is transmitted based on a synchronous public channel. In addition, since frames are numbered and frame number information is utilized for signal processing, confusion is prevented, post-processing information for a plurality of frames is simultaneously transmitted, and thus utilization efficiency of a public channel is increased. Besides, since a signal processing completion signal is checked, the integrity of an ultimately generated key is ensured.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand the scope of the claimed invention is not limited by the explicitly described above embodiments but by the claims and equivalents thereof.

What is claimed is:

1. A transmitter for generating and processing quantum signals in regular frame units in a quantum key distribution system, the transmitter comprising:
   a photon pulse stream generator, implemented by one or more processors and/or application-specific integrated circuits (ASICs), configured to
      generate streaming of photon pulses including frame-unit quantum information, the frame-unit quantum information indicating quantum information that is generated in frame units, wherein each frame including the quantum information are numbered to have each corresponding frame number, and
      periodically transmit the frame-unit quantum information through a quantum channel without waiting to receive a frame reception and signal processing completion information from a receiver of the quantum key distribution system;
   a public channel transceiver, implemented by one or more processors and/or application-specific integrated circuits (ASICs), configured to communicate with the receiver of the quantum key distribution system through a public channel being a communication channel different with the quantum channel;
   a frame synchronization information generator, implemented by one or more processors and/or application-specific integrated circuits (ASICs), configured to
      generate frame synchronization information for frame synchronization of the receiver, and
      transmit the frame synchronization information through the public channel transceiver to the receiver, for every frame or every several frames; and
   first and second signal processors, implemented by one or more processors and/or application-specific integrated circuits (ASICs), configured to transmit and receive open information, together with the frame number information for a corresponding frame or a corresponding several frames, per on every frame or every several frames through the public channel transceiver, the open information being used in signal processing including pre-processing and post-processing for the corresponding frame or the corresponding several frames, and
process the quantum information in frame units using the open information identified by the frame number information.

2. The transmitter of claim 1, wherein the frame synchronization information is transmitted together with frame number information.

3. The transmitter of claim 1, wherein, before the quantum information is transmitted in frame units,
the photon pulse stream generator is configured to transmit a synchronization frame through the quantum channel, and the public channel transceiver is configured to transmit synchronization information through the public channel, wherein the synchronization information is open information on the synchronization frame.

4. The transmitter of claim 1, wherein the open information includes first open information for pre-processing being performed by the receiver and second open information for post-processing being performed by the receiver, and the first open information is transmitted prior to second open information.

5. A method for generating and processing quantum signals in regular frame units by a transmitter of a quantum key distribution system, the transmitter implemented by one or more processors and/or application-specific integrated circuits (ASICs) to execute the method comprising:
transmitting frame synchronization information for frame synchronization of a receiver of the quantum key distribution system through a public channel being a communication channel different with a quantum channel;
generating streaming of photon pulses including frame-unit quantum information, the frame-unit quantum information indicating quantum information that is generated in frame units, wherein each frame including the frame-unit quantum information are numbered to have each corresponding frame number; and
periodically transmitting the frame-unit quantum information to the receiver through the quantum channel without waiting to receive a frame reception and signal processing completion information from the receiver; and
transmitting open information, together with the frame number information for a corresponding frame or a corresponding several frames, per on each frame in the quantum information through the public channel, the open information being used in signal processing including pre-processing and post-processing for the corresponding frame or the corresponding several frames.

6. The method of claim 5, wherein the transmitting of the frame synchronization information comprises
transmitting the frame synchronization information for the every frame or the every several frames.

7. The method of claim 6, wherein the frame synchronization information is transmitted together with frame number information.

8. The method of claim 5, wherein the generating of the quantum information comprises,
before the frame-unit quantum information is transmitted in frame units,
transmitting a synchronization frame for synchronization of the receiver through the quantum channel, and
transmitting synchronization information on the synchronization frame through the public channel.

9. The method of claim 5, wherein the open information includes first open information for the pre-processing being performed by the receiver and second open information for the post-processing being performed by the receiver, the first open information is transmitted prior to the second open information.

10. The method of claim 5, further comprising:
determining whether to use key information generated in each frame as a quantum key, depending on whether a signal used to identify that the first signal processing and the second signal processing per a frame unit satisfy a predetermined condition is received from the receiver.

* * * * *